(12) United States Patent
Li et al.

(10) Patent No.: US 11,776,188 B2
(45) Date of Patent: Oct. 3, 2023

(54) STYLE-AWARE AUDIO-DRIVEN TALKING HEAD ANIMATION FROM A SINGLE IMAGE

(71) Applicant: Adobe Inc., San Jose, CA (US)

(72) Inventors: Dingzeyu Li, Seattle, WA (US); Yang Zhou, Amherst, MA (US); Jose Ignacio Echevarria Vallespi, South San Francisco, CA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/887,685

(22) Filed: Aug. 15, 2022

(65) Prior Publication Data

US 2022/0392131 A1 Dec. 8, 2022

Related U.S. Application Data

(63) Continuation of application No. 16/788,551, filed on Feb. 12, 2020, now Pat. No. 11,417,041.

(51) Int. Cl.
*G06T 13/20* (2011.01)
*G06T 17/20* (2006.01)
*G06T 13/40* (2011.01)

(52) U.S. Cl.
CPC ............ *G06T 13/205* (2013.01); *G06T 13/40* (2013.01); *G06T 17/20* (2013.01)

(58) Field of Classification Search
CPC ....... G06T 13/205; G06T 13/40; G06T 17/20; G10L 25/30; G10L 2021/105; G10L 21/10
See application file for complete search history.

(56) References Cited

U.S. PATENT DOCUMENTS 9,870,508 B1 1/2018 Hodgson et al.
10,127,908 B1 11/2018 Deller et al.
2002/0097380 A1* 7/2002 Moulton ................ G11B 27/10
704/E21.02

(Continued)

OTHER PUBLICATIONS

Zhou, Y., et al., "VisemeNet: Audio-Driven Animator-Centric Speech Animation", ACM Transactions on Graphics, vol. 37, No. 4, Article 161, pp. 1-10 (Year: 2018).*

(Continued)

*Primary Examiner* — Michael Le
(74) *Attorney, Agent, or Firm* — SHOOK, HARDY & BACON L.L.P.

(57) ABSTRACT

Embodiments of the present invention provide systems, methods, and computer storage media for generating an animation of a talking head from an input audio signal of speech and a representation (such as a static image) of a head to animate. Generally, a neural network can learn to predict a set of 3D facial landmarks that can be used to drive the animation. In some embodiments, the neural network can learn to detect different speaking styles in the input speech and account for the different speaking styles when predicting the 3D facial landmarks. Generally, template 3D facial landmarks can be identified or extracted from the input image or other representation of the head, and the template 3D facial landmarks can be used with successive windows of audio from the input speech to predict 3D facial landmarks and generate a corresponding animation with plausible 3D effects.

20 Claims, 7 Drawing Sheets

(56) References Cited

U.S. PATENT DOCUMENTS

| | | | | |
|---|---|---|---|---|
| 2006/0290699 | A1* | 12/2006 | Dimtrva | H04N 21/4341 |
| | | | | 345/473 |
| 2007/0009180 | A1 | 1/2007 | Huang et al. | |
| 2009/0132371 | A1 | 5/2009 | Strietzel et al. | |
| 2012/0249762 | A1 | 10/2012 | Exner | |
| 2014/0210831 | A1 | 7/2014 | Stenger et al. | |
| 2017/0236250 | A1* | 8/2017 | Kim | G06V 40/165 |
| | | | | 382/190 |
| 2018/0178372 | A1 | 6/2018 | Lee et al. | |
| 2019/0130628 | A1 | 5/2019 | Cao et al. | |
| 2020/0051565 | A1 | 2/2020 | Singh | |
| 2020/0126283 | A1* | 4/2020 | van Vuuren | G06T 17/20 |
| 2020/0234690 | A1* | 7/2020 | Savchenkov | G06T 13/40 |
| 2020/0279553 | A1* | 9/2020 | McDuff | G10L 25/78 |
| 2020/0365166 | A1* | 11/2020 | Zhang | G10L 21/013 |
| 2022/0415306 | A1* | 12/2022 | Clark | G06N 3/045 |

OTHER PUBLICATIONS

"#SweetTalkSneak: Adobe MAX 2019 (Sneak Peek) | Adobe Creative Cloud—YouTube", YouTube, Retrieved from Internet URL : https://www.youtube.com/watch?v=JKZcYqZA800, accessed on Apr. 2, 2020, pp. 3.

Bulat, A., and Tzimiropoulos, G., "How far are we from solving the 2D & 3D Face Alignment problem? (and a dataset of 230,000 3D facial landmarks)", In Proceedings of the IEEE International Conference on Computer Vision, pp. 1021-1030 (2017).

Cudeiro, D., et al., "Capture, Learning, and Synthesis of 3D Speaking Styles", In Proceedings of the IEEE Conference on Computer Vision and Pattern Recognition, pp. 10101-10111 (2019).

Edwards, P., et al., "JALI: An Animator-Centric Viseme Model for Expressive Lip Synchronization", ACM Transactions on Graphics, vol. 35, No. 4, Article 127, pp. 1-11 (Jul. 2016).

Karras, T., "Audio-Driven Facial Animation by Joint End-to-End Learning of Pose and Emotion", ACM Transactions on Graphics, vol. 36, No. 4, Article 94, pp. 1-12 (Jul. 2017).

Oh, T., H., et al., "Speech2Face: Learning the Face Behind a Voice", In Proceedings of the IEEE Conference on Computer Vision and Pattern Recognition, pp. 7539-7548 (2019).

Qian, K., et al., "AUT0VC: Zero-Shot Voice Style Transfer with Only Autoencoder Loss", In Proceedings of the 36th International Conference on Machine Learning, PMLR 97, pp. 1-12 (Jun. 6, 2019).

Suwajanakorn, S., et al., "Synthesizing Obama: Learning Lip Sync from Audio", ACM Transactions on Graphics, DOI: http://dx.doi.org/10.1145/3072959.3073640, vol. 36, No. 4, Article 95, pp. 1-13 (Jul. 2017).

Taylor, S., et al., "A Deep Learning Approach for Generalized Speech Animation", ACM Transactions on Graphics, vol. 36, No. 4, Article 93, pp. 1-11 (Jul. 2017).

Weng, C., Y., et al., "Photo Wake-Up: 3D Character Animation from a Single Photo", In Proceedings of the IEEE Conference on Computer Vision and Pattern Recognition, pp. 5908-5917 (2019).

Zhou, Y., et al., "VisemeNet: Audio-Driven Animator-Centric Speech Animation", ACM Transactions on Graphics, vol. 37, No. 4, Article 161, pp. 1-10 (Aug. 2018).

* cited by examiner

STYLE-AWARE AUDIO-DRIVEN TALKING HEAD ANIMATION FROM A SINGLE IMAGE

CROSS-REFERENCE TO RELATED APPLICATIONS

This application is a Continuation of U.S. patent application Ser. No. 16/788,551 filed Feb. 12, 2020, the entire contents of which are incorporated by reference herein in their entirety.

BACKGROUND

Animators often seek to animate facial expressions. However, animating realistic facial expressions can be challenging since facial movement depends on many complicated muscle movements. Some traditional animation techniques make use of key-framing to animate characters and their facial expressions. For example, to animate a character's mouth, an animator would key-frame the mouth by manually animating each key-frame one frame at a time. However, it is not always intuitive for some animators to focus on movements of the mouth.

Some recent animation techniques use software to automatically convert an audio signal of speech into corresponding key-frames for the mouth. This type of audio-driven animation can provide a more intuitive and accessible interface for some animators that find it easier to work directly with audio or speech. One conventional audio-driven animation technique attempts to detect phonemes in input speech and map detected phonemes to corresponding facial animations. More recently, audio-driven "deep fake" videos have emerged. Deep fake videos can depict someone speaking, and may appear somewhat realistic. However, the videos are fake in the sense that at least some frames of the video depict speech that never actually occurred. Some audio-driven deep fakes are generated by predicting each video frame directly from input speech. In each of these cases, the quality of the animation or video output has been limited.

SUMMARY

Embodiments of the present invention are directed to audio-driven animation of a talking head from an input audio signal of speech and a representation of a head to animate (e.g., a static image of a character's head). A set of template 3D facial landmarks can be extracted from the input image of the head, an audio feature vector can be extracted from the input audio signal, and the template 3D facial landmarks and audio feature vector can be used as inputs into a neural network that predicts 3D facial landmarks reflecting facial dynamics corresponding to the input speech. The template 3D facial landmarks can serve as an initial structure representing an identity and/or a rest pose. By using an initial structure as an input, the neural network can be trained to predict displacement from the initial structure. This serves to disentangle identity, enabling the neural network to be applied during operation to different identities than the one (or more) on which it was trained.

Generally, the neural network may include a recurrent neural network configured to generate a set of predicted 3D facial landmarks corresponding to a particular window of audio. The set of predicted 3D facial landmarks reflect a predicted position, orientation, and/or expression of the body parts corresponding to the initial structure, when speaking the portion of speech in the window of audio. By inputting a desired set of 3D facial landmarks as the initial structure, the neural network can learn to use the initial structure as a template to predict corresponding 3D facial landmarks that can be used to selectively animate and synchronize motion for the corresponding parts of the face and head reflected by the initial structure. To generate video frames for the animation, the input image of the head can be warped to fit the predicted 3D facial landmarks (e.g., for each window of audio), and the resulting frames can be compiled along with the input audio into an animation of a talking head saying the input speech.

The neural network may be designed to predict 3D facial landmarks by accounting for a single speaking style or multiple speaking styles. In embodiments in which the neural network accounts for different speaking styles, a set of template facial landmarks and an audio feature vector can be used as inputs into a neural network that automatically detects different speaking styles from arbitrary vocal clips and predicts 3D facial landmarks corresponding to a detected style. In some embodiments, instead of automatically detecting a speaking style from the vocal clip, the neural network can be selectively set to predict 3D facial landmarks for a specified style during operation. For example, upon receiving an input designating a desired style to use, the style can be encoded and input into a decoder in the network in order to force the network to predict 3D facial landmarks for the specified style. As such, in these embodiments, the neural network can adapt to different speaking styles.

Accordingly, using implementations described herein, professional animators and even amateurs can easily generate an animation of a talking head from an input audio signal of speech. Depending on the implementation, a neural network can learn to selectively animate and synchronize motion for a desired set of body parts of the face and head, including lips, nose, eyes, ears, and head pose. Template 3D facial landmarks can be identified or extracted from an input image or other representation of a head to animate, and the template 3D facial landmarks can be used with successive windows of audio from the input speech to predict 3D facial landmarks and generate a corresponding animation with plausible 3D effects.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawings, wherein.

DETAILED DESCRIPTION

Overview

Figure 1:
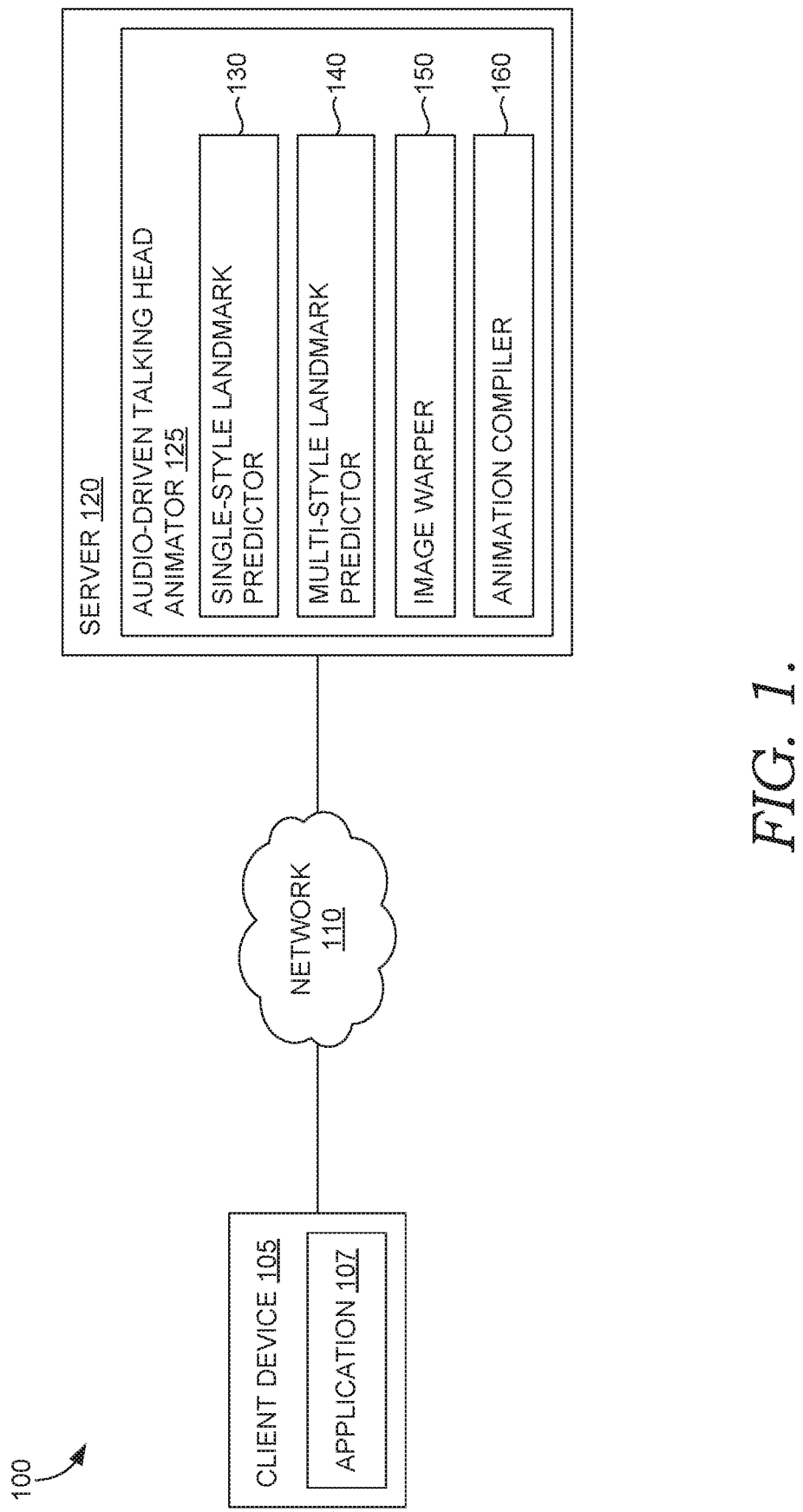
FIG. 1 is a block diagram of an example computing system for audio-driven talking head animation, in accordance with some embodiments.

There is little prior work on audio-driven facial animation. Existing solutions can be broadly classified into procedural animation and deep learning data-driven approaches. Procedural animation techniques such as lip sync animation generally work by extracting phonemes from an input audio signal or textual transcript, and then mapping the extracted phonemes to corresponding visemes. Over time, procedural animation maps phonetic streams to viseme motion curves. At least one conventional technique has applied deep learning to map phonemes to visemes. However, one of the drawbacks with these and other phoneme-based approaches is that they require accurate phoneme prediction (e.g., textual transcript phonetic alignment, automatic speech recognition, etc.), and current phoneme prediction techniques often produce misclassifications, which can compound over time. For example, techniques that predict phoneme from an audio waveform can have unwanted dependencies on speech intensity, pitch, emphasis, syllable duration, and other characteristics that may be present in a raw audio waveform. Furthermore, conventional phoneme to viseme maps fail to account for the one-to-many relationship between some phonemes and the possible corresponding facial expressions, thereby producing inaccuracies in the resulting animations. Moreover, phoneme-based approaches often generate output video with discontinuities between successive facial positions. Finally, phoneme-based approaches have conventionally been limited to animation of only a character's lips, not eyes, nose, and head poses, which can sometime cause the resulting character animation to appear unrealistic More recent deep-learning based approaches to audio-driven animation predict facial animation from input audio waves without relying on phoneme predictions. However, conventional deep-learning based approaches to audio-driven animation have a number of drawbacks. For example, conventional techniques predict a whole image for each video frame. Since there can be millions of pixels to predict for each video frame, conventional techniques are highly computationally challenging and costly. Furthermore, conventional deep-learning based approaches to audio-driven animation have produced limited accuracy. For example, conventional techniques have been limited to animations of the mouth region, which often cause the output animation to appear unrealistic. One prior technique can generate neutral head motion using re-timing dynamic programming. However, since this head motion is generated based simply on binary detection between utterance and silence, the resulting head motion is crude and unrealistic. Moreover, this conventional technique for generating head motion only works on specific face meshes or 3D rigs, so the applicability is limited to skilled animators with access to 3D software and face meshes or 3D rigs for the characters to be animated.

Accordingly, embodiments described herein are directed to audio-driven animation of a talking head from an input audio signal of speech and a representation such as a static image of a head to animate with the speech. A set of template 3D facial landmarks can be extracted from the input image of the head, an audio feature vector can be extracted from the input audio signal, and the template facial landmarks and audio feature vector can be used as inputs into a neural network that predicts 3D facial landmarks reflecting facial dynamics corresponding to the input speech. Generally, the template 3D facial landmarks can serve as an initial structure representing an identity and/or a rest pose. By using an initial structure as an input, the neural network can learn to predict displacement from the initial structure. This serves to disentangle identity, enabling the neural network to be applied during operation to different identities than the one (or more) on which it was trained.

Generally, the neural network may be a recurrent neural network configured to generate a set of predicted 3D facial landmarks corresponding to a particular window of audio. In other words, the set of predicted 3D facial landmarks reflect a predicted position, orientation, and/or expression of the body parts corresponding to the initial structure, when speaking the portion of speech in the window of audio. By inputting a desired set of 3D facial landmarks as the initial structure, the neural network can learn to use the initial structure as a template to predict corresponding 3D facial landmarks that can be used to selectively animate and synchronize motion for the corresponding parts of the face and head reflected by the initial structure. Thus, unlike prior techniques, the present audio-driven animation techniques can synchronize multiple components of a talking head, including lips, nose, eyes, ears, and head pose. As such, the present techniques can generate more realistic looking animations than prior techniques. To generate video frames for the animation, the input image of the head can be warped to fit the predicted 3D facial landmarks (e.g., for each window of audio), and the resulting frames can be compiled along with the input audio into an animation.

There are a number of benefits that result from predicting a sparse set of 3D facial landmarks instead of a full resolution image like conventional techniques. For example, since the neural network only needs to predict a sparse set of landmarks, the network size can be much smaller, making training time faster and leaving more capacity for other features such as learning to recognize different speaker styles, as described in more detail below. Another benefit to predicting 3D facial landmarks instead of a full resolution image is that it disentangles identity (e.g., facial proportions) from the dynamics of facial motion. Thus, the network can learn to predict deformation or displacement of landmarks, which is transferrable to other identities, independent of facial proportions. In other words, even if the network is trained using videos of a single face, the network can learn to predict 3D facial landmarks that can drive animations of other faces, significantly extending use cases and applications. Finally, directly predicting 3D facial landmarks without relying on a phoneme map as an intermediate step removes dependencies on many unwanted audio characteristics that may be present in raw wave forms, as the neural network learns to ignore characteristics that do not carry relevant information.

In some embodiments, the neural network can learn to account for different speaking styles. Generally, different speaking styles (e.g., sentiment, pitch, emotion, speed, pace of speech) have been found to have a correlation with different styles of facial motion. Since different speaking styles can be captured in an audio recording of speech, the audio recording also captures different styles of facial motion, at least to an extent. In other words, when we hear different speaking styles (e.g., active, quiet, sad), we associate them with different styles of facial motion. As such, in some embodiments, a set of template facial landmarks and an audio feature vector can be used as inputs into a neural network that automatically detects different speaking styles in an arbitrary vocal clip and predicts 3D facial landmarks corresponding to that style. In some embodiments, the neural network can be set to predict 3D facial landmarks for a specified style during operation. For example, the neural network may include a multi-style landmark decoder, and upon receiving an input designating a desired style to use, the input into the multi-style landmark decoder can be switched and fed a style embedding corresponding to the desired style. This configuration can force the landmark decoder to predict 3D facial landmarks corresponding to the specified style. As such, in these embodiments, the neural network can adapt to different speaking styles, unlike prior techniques.

Whether accounting for different speaking styles or not, predicted 3D facial landmarks may be generated from input speech and some representation of a head to animate, and the predicted 3D facial landmarks may be used to generate an animation of a talking head (e.g., a person or character saying the input speech). For example, a window of audio from the input speech can be encoded and used to generate an animation frame. In some embodiments, the head to animate may be input as a single, static input image of a person or character (e.g., a portrait). To generate an animation frame, Delaunay triangulation can be applied on the predicted 3D facial landmarks over a given input image to drive an image warping. Any type of warping may be applied to warp the image and align each facial landmark point in the image with its corresponding triangle region, and the resulting warped output image may be used as an animation frame. Each window of audio from the input speech may be used to generate a set of predicted 3D landmarks, which can be applied to warp the input image to generate a corresponding output frame. Based on the motion of the predicted 3D facial landmarks over time and corresponding warped images, the resulting output frames can serve as the basis for an animation video (e.g., the output frames can be stitched together to compose the video). Thus, an animation can be generated from a single input image of a head to animate. In these embodiments, face meshes or 3D rigs are no longer needed to animate characters, making it easier for even amateurs to generate realistic talking heads.

In some embodiments, the head to animate may be input using some other structure besides a single image. For example, the head to animate may be input as 2D layered artwork (e.g., with different parts of the face in different layers). In that scenario, correspondence between points in the 2D layers and 3D facial landmarks can be identified and used to drive an animation of the person or character in the 2D layered artwork. More specifically, once the correspondence between the 2D layout and 3D facial landmarks is established, any change to the predicted 3D landmarks can be mapped to corresponding changes in the 2D layout. Each window of audio from the input speech can be used to update the 2D layout, and the updates (e.g., each update) can be used as a basis for corresponding animation frames for a video.

In some embodiments, the head to animate may be input as a 3D mesh or a 3D rig, the template 3D facial landmarks may be selected from (or based on) points in the 3D mesh or 3D rig, and the predicted 3D facial landmarks can be used as 3D model controls or 3D rigging controls by using the predicted landmarks to generate control parameters for the 3D mesh or 3D rig. Each window of audio from the input speech can be used to update the 3D mesh or 3D rig. The updated 3D mesh or 3D rig may be used to render an animation frame for a video, or may be projected into augmented reality or virtual reality to generate realistic 3D avatars, virtual assistants, creatures, and the like. These are just a few examples of possible structures that may be used to designate the head to animate, and other variations are contemplated within the present disclosure.

In each of these foregoing scenarios, an animation can be generated by analyzing a particular window of an input audio signal at a given time. This is in contrast to conventional techniques that analyze a particular point of audio at a given time, for example, to predict a corresponding phoneme. Generating a particular animation frame from a window of audio removes each frame's dependency upon a particular point of time. Since each animation step no longer needs to be based solely on a single point from the input, using a window of audio as an input can account for the one-to-many relationship between some phonemes and the potential corresponding facial expressions, thereby producing smoother and more continuous animations.

As such, using implementations described herein, professional animators and even amateurs can easily generate an animation of a talking head from an input audio signal of speech. Depending on the implementation, a neural network can learn to selectively animate and synchronize motion for a desired set of body parts of the face and head, including lips, nose, eyes, ears, and head pose. More specifically, the neural network can predict a set of 3D facial landmarks that can be used to drive the animation. In some embodiments, the neural network can learn to detect different speaking styles in the input speech and account for the different speaking styles when predicting the 3D facial landmarks. Different embodiments may be implemented depending on the structure used to input the person or character to be animated. Generally, template 3D facial landmarks can be identified or extracted from an input image, 2D layered artwork, a face mesh, or a 3D rig of the head to animate, and the template 3D facial landmarks can be used with successive windows of audio from the input speech to predict 3D facial landmarks and generate a corresponding animation with plausible 3D effects.

The various techniques described herein reflect a number of improvements over prior techniques. In addition to the benefits described above, some embodiments can generate dynamic 3D facial landmarks with head poses using only audio and a single static image as inputs. This is a significant step from previous methods. Broadly speaking, audio-driven facial animation can significantly ease an animation pipeline. For example, being able to generate 3D human head models from only audio and a single static image can greatly assist with professional movie VFX production. Furthermore, prior audio-driven talking head techniques generally animate only the mouth region given an audio input. In other words, the eyes, the nose, ears, and head pose are not animated in the automatic process. By contrast, the present techniques can animate all these features simultaneously, resulting in a more realistic animation than in prior techniques. Moreover, and unlike prior techniques, embodiments that account for different speaking styles are able to account for different stylized facial motion carried in an audio signal of input speech. These are just a few benefits of the various embodiments described herein.

Having briefly described an overview of aspects of the present invention, various terms used throughout this description are provided. Although more details regarding various terms are provided throughout this description, general descriptions of some terms are included below to provider a clearer understanding of the ideas disclosed herein:

As used herein, a neural network generally refers to a machine-learning model that learns to approximate unknown functions by analyzing example (e.g., training) data at different levels of abstraction. Generally, neural networks can model complex non-linear relationships by generating hidden vector outputs along a sequence of inputs. In particular, a neural network can include a model of interconnected digital neurons that communicate and learn to approximate complex functions and generate outputs based on a plurality of inputs provided to the model. A neural network can include a variety of deep learning models, including convolutional neural networks, recurrent neural networks, deep neural networks, and deep stacking networks, to name a few examples. A neural network may include or otherwise make use of one or more machine learning algorithms to learn from training data. In other words, a neural network can include an algorithm that implements deep learning techniques such as machine learning to attempt to model high-level abstractions in data.

Three dimensional (3D) facial landmarks generally refer to a set of points in 3D space that represent specific points (landmarks) on a face. The position, orientation, and expression of a particular face can be represented by a set of 3D facial landmarks (e.g., the values or 3D positions of the 3D facial landmarks). One common application uses 68 facial landmarks, however, any number of facial landmarks may be used.

Some embodiments distinguish between speech content and speaking style. Speech content generally refers to what a speaker is saying, while speaking style refers to how or she is saying it. For example, speech content may include structure (e.g., phonemes, words, sentences) and/or semantic meaning. Speaking style may include speech intensity, pitch, emphasis, syllable duration, and/or other characteristics. In some embodiments, speech content and speaking style may be separately encoded and combined to account for different speaking styles.

Example Audio-Driven Animation Environment

Referring now to FIG. 1, a block diagram of an example computing system for audio-driven talking head animation is shown. Generally, environment 100 is suitable for audio-driven animation, and, among other things, facilitates automatic generation of an animation from an audio signal of speech and an image or some other structure representing a head to animate. Environment 100 includes client device 105 and server 120. Client device 105 and server 120 may communicate with each other via a network 110, which may include, without limitation, one or more local area networks (LANs) and/or wide area networks (WANs). Such networking environments are commonplace in offices, enterprise-wide computer networks, intranets, and the Internet. Generally, client device 105 and/or server 120 can be any kind of computing device capable of facilitating animation generation. For example, in an embodiment, client device 105 and/or server 120 can be a computing device such as computing device 700, as described below with reference to FIG. 7. In embodiments, client device 105 can be a personal computer (PC), a laptop computer, a workstation, a mobile computing device, a PDA, a cell phone, or the like.

In the embodiment illustrated in FIG. 1, client device 105 includes application 107. Application 107 may generally be any application capable of facilitating audio-driven animation. Application 107 may be a stand-alone application, a mobile application, a web application, or the like. In some implementations, the application(s) comprises a web application, which can run in a web browser, and could be hosted at least partially server-side. Additionally or alternatively, the application(s) can comprise a dedicated application. In some cases, the application can be integrated into an operating system (e.g., as a service) of client device 105 or server 120. One example application that may be used for animation is ADOBE® CHARACTER ANIMATOR®, which is a motion capture and animation tool.

Server 120 includes audio-driven talking head animator 125. Generally, audio-driven talking head animator 125 automatically generates an animation of a talking head from an audio signal of speech and an image or some other structure representing a head to animate. Although embodiments are generally described with audio-driven talking head animator 125 residing on server 120, in some embodiments, audio-driven talking head animator 125 or some portion thereof may be incorporated, or integrated, into an application, or an add-on or plug-in to an application, such as application 107 residing on client device 105. Additionally or alternatively, audio-driven talking head animator 125 or some portion thereof can be integrated into an operating system (e.g., as a service) of client device 105 or server 120. The illustrated allocation of functionality across the components of environment 100 is meant merely as an example, and any other suitable allocation may be implemented.

At a high level, a user operating application 107 on client device 105 may identify an audio signal of speech and an image or some other structure representing a head to animate, and application 107 may transmit the input speech and input image (or corresponding paths at which the input speech and input image may be accessed) to audio-driven talking head animator 125 via network 110. Audio-driven talking head animator 125 may generate an animation of the talking head and return the video (or a corresponding path) back to application 107 via network 110. In a simple example, a user might upload an audio clip and an image to be animated, and server 120 might return an animated video.

The input speech may be a recorded or synthesized audio signal of speech, which may be in any spoken language (e.g., English, Japanese, etc.). The audio signal may be represented in any file format, such as uncompressed audio (e.g., WAV, AIFF, AU, RAW), formats with lossless compression (e.g., FLAC, MPEG-4, ATRAC Advanced Lossless, WMA Lossless, SHN), formats with lossy compression (e.g., MP3, AAC, ATRAC WMA lossy), or others. The input image may be any type of image or portrait depicting the head of a person or character to animate, whether captured (e.g., a photograph), synthesized (e.g., composed using creative software), or otherwise. For example, the input image may be an image or photo of a cartoon or anime character (e.g., generated using creative software), a real person, a famous sculpture or painting such as the Mona Lisa, a hand-drawn sketch of a person or character, Japanese manga, a stylized caricature, and the like. The input image may use any type of file format, such as JPEG, TIFF, GIF, BMP, or PNG, to name a few common examples. The input speech and/or input image may be accessible via application 107 (e.g., stored locally on client device 105, accessible from some remote location such as cloud storage or an internet location) such that a user may use application 107 to access, transmit, or otherwise identify the input speech and input image to audio-driven talking head animator 125.

In embodiments that use an image to represent the head to animate, audio-driven talking head animator 125 generates an animation of a talking head from the input speech and the input image. In the embodiment illustrated in FIG. 1, audio-driven talking head animator 125 includes single-style landmark predictor 130, multi-style landmark predictor 140, image warper 150, and animation compiler 160. More specifically, audio-driven talking head animator 125 may include a neural network (e.g., single-style landmark predictor 130 or multi-style landmark predictor 140) configured to predict a set of 3D facial landmarks from a window of input speech and a set of template facial landmarks (e.g., which may be extracted from the input image). By feeding successive windows of audio into the neural network, the neural network can predict successive sets of 3D facial landmarks, which can be used (e.g., by image warper 150) to warp the input image into successive animation frames such that the head in each of the warped images looks like it is saying the portion of speech in a corresponding audio window. Finally, animation compiler 160 may compile the successive animation frames along with the input speech into an animation video of a talking head saying the input speech.

Figure 2:
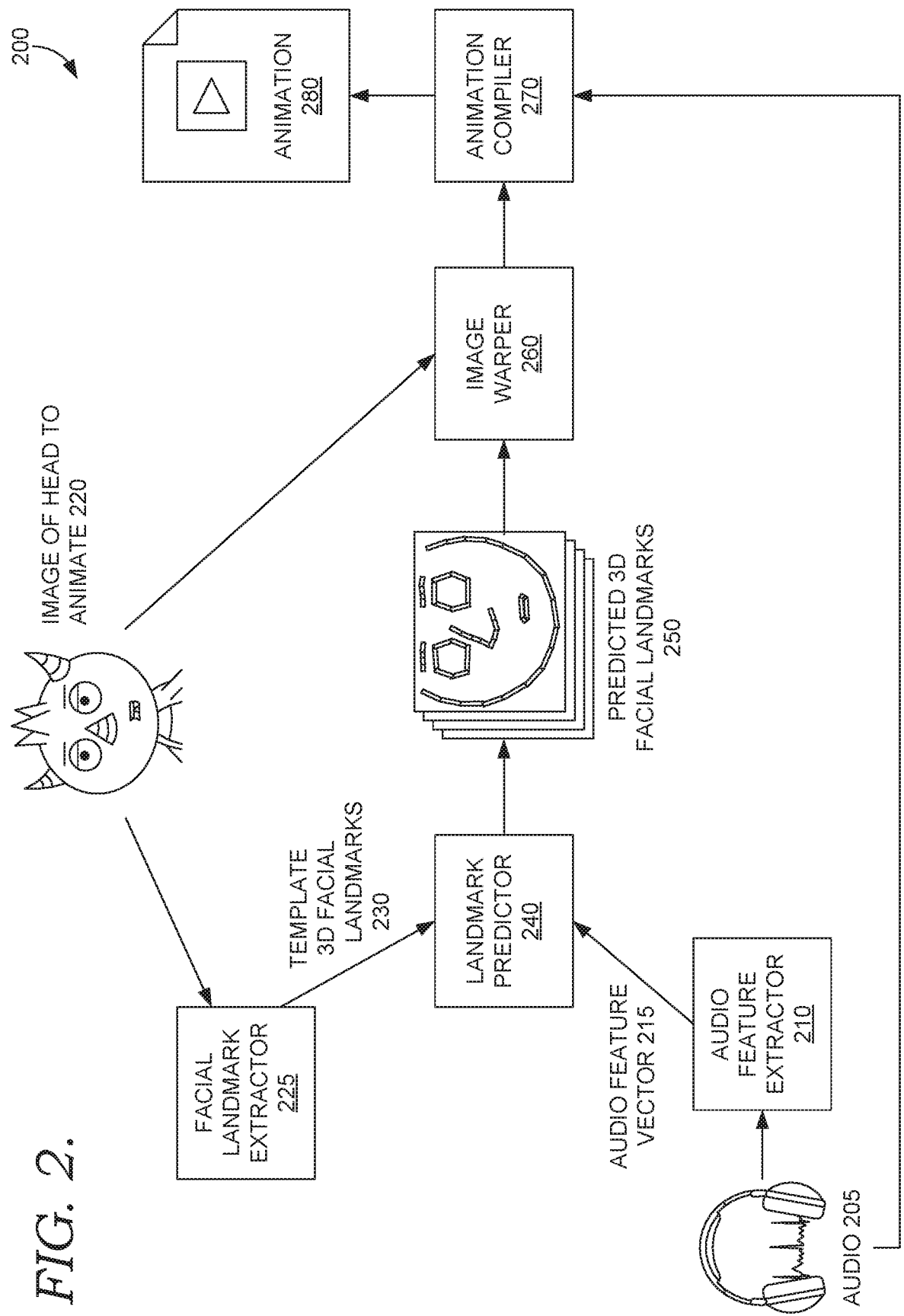
FIG. 2 is a block diagram of an example audio-driven talking head animator, in accordance with some embodiments.

Turning now to FIG. 2, FIG. 2 illustrates a block diagram of an example audio-driven talking head animator 200, in accordance with some embodiments that use an image to represent the head to animate. In the example illustrated in FIG. 2, audio-driven talking head animator 200 includes audio feature extractor 210, facial landmark extractor 225, landmark predictor 240 (which may correspond with single-style landmark predictor 130 or multi-style landmark predictor 140 of FIG. 1), image warper 260 (which may correspond with image warper 150 of FIG. 1), and animation compiler 270 (which may correspond with animation compiler 160 of FIG. 1). In this example, the inputs into audio-driven talking head animator 200 are audio 205 and an image of a head to animate 220. At a high level, facial landmark extractor 225 may extract a set of template facial landmarks 230 from the image of the head 220, and audio feature extractor 210 may extract an audio feature vector 215 from a window of audio 205. The set of template facial landmarks 230 and audio feature vector 215 are input into landmark predictor 240, which generates predicted 3D facial landmarks 250 corresponding to the window of audio 205. Image warper 260 uses the predicted 3D facial landmarks 250 to warp the image of the head 220 to generate an animation frame. The process may be repeated for successive windows of audio 205 to generate successive animation frames, which are compiled by animation compiler 270 into an animation video, using audio 205 as the audio track.

In some embodiments, audio feature extractor 210 exacts audio feature vectors from a sliding window of audio 205 (e.g., an audio recording, audio clip, audio track). For example, an audio recording can be broken into chunks of a designated duration (whether pre-determined or configurable), and each chunk can be used to generate a separate audio feature vector. Each processed audio chunk may be used to generate a separate video frame. For example, to generate a frame rate of around 30 frames per second (which is usually sufficient for animation), chunks from a 32 ms window of audio may be used. In some embodiments, the window can be advanced by some step size that is less than the window size so the resulting audio chunks partially overlap. In some embodiments, window size, step size, and/or frame rate may be configurable (e.g., via a user interface of application 107 of FIG. 1) to achieve a desired output.

To generate audio feature vectors (e.g., audio feature vector 215), for each window of audio 205 associated with time t (e.g., starting at time t, centered at time t), audio feature extractor 210 may generate a time-frequency representation of the chunk of audio in the window. For example, audio feature extractor 210 may perform a transform such as a short-term Fourier transform (STFT) on the chunk of audio 205 in the window to generate a 2D STFT spectrogram. The 2D STFT spectrogram may be stored in a data structure (e.g., a matrix or tensor) that includes a time axis or dimension (t) and a frequency axis or dimension (f), and for each point (t,f), the 2D STFT spectrogram may store the complex STFT coefficients (e.g., with magnitude and/or phase values). In some embodiments, phase values can be dropped. Generally, audio feature extractor 210 may split the 2D STFT spectrogram (e.g., along the time axis) and flatten the spectrogram into a single dimensional audio feature vector. For example, if the spectrogram has N columns corresponding to N samples from the window of audio 205, the N columns can be flattened by concatenating the values of the columns (e.g., magnitude and/or phase values) into a single dimensional vector (e.g., audio feature vector 215). In some embodiments such as where the spectrogram is dense, audio feature extractor 210 may sample the spectrogram by flattening every $X^{th}$ column into the audio feature vector 215. These operations are meant merely as an example, and other suitable techniques may be employed to extract an audio feature vector from audio 205.

In embodiments that use an image to represent the head to animate, facial landmark extractor 225 may extract a set of template facial landmarks 230 from the image of the head 220, and the template facial landmarks 230 may be used by the landmark predictor 240 to generate predicted 3D facial landmarks 250. In this scenario, the template facial landmarks 230 can serve as an initial structure representing an identity and/or a rest pose. By using an initial structure as an input into the landmark predictor 240, the landmark predictor 240 can learn to predict corresponding facial landmarks that reflect displacement of the initial structure. That is, the landmark predictor 240 can learn to predict displacement based on an initial structure. This configuration effectively serves to disentangle identity, enabling the landmark predictor 240 to be applied to different identities than the one (or more) identities on which it was trained. In other words, even if landmark predictor 240 is trained using videos of a single face, it can learn to predict 3D facial landmarks that can drive animations of faces other than those it was trained on, significantly extending use cases and applications.

Generally, facial landmark extractor 225 may be designed to extract a set of template 3D facial landmarks corresponding to the desired facial features to animate. For example, one common application uses 68 3D facial landmarks, which can represent the position, orientation, and expression of various parts of a face, including lips, nose, eyes, ears, and head pose. In some embodiments, rather than choosing to represent each of the parts of a face, a corresponding set of 3D facial landmarks can be selected to represent some subset of body parts (e.g., omit body pose or nose, eyebrows only, head pose only), or simply displacement of a certain portion of the face (e.g., how much the mouth opens and closes). By selecting an appropriate initial structure, the landmark predictor 240 can be trained to selectively animate a corresponding subset of body parts. These are just a few examples, and other variations and combinations may be implemented within the scope of the present disclosure.

Generally, landmark extractor 225 may use any known technique to detect and/or extract a set of facial landmarks from an input image, as will be understood by those of ordinary skill in the art. In embodiments which the head to animate is input using some other structure besides an image (e.g., 2D layered artwork, 3D mesh, 3D rig), facial landmark extractor 225 may be adapted to select, detect, extract, or otherwise convert the input structure into the set of template facial landmarks, if necessary.

Figure 3:
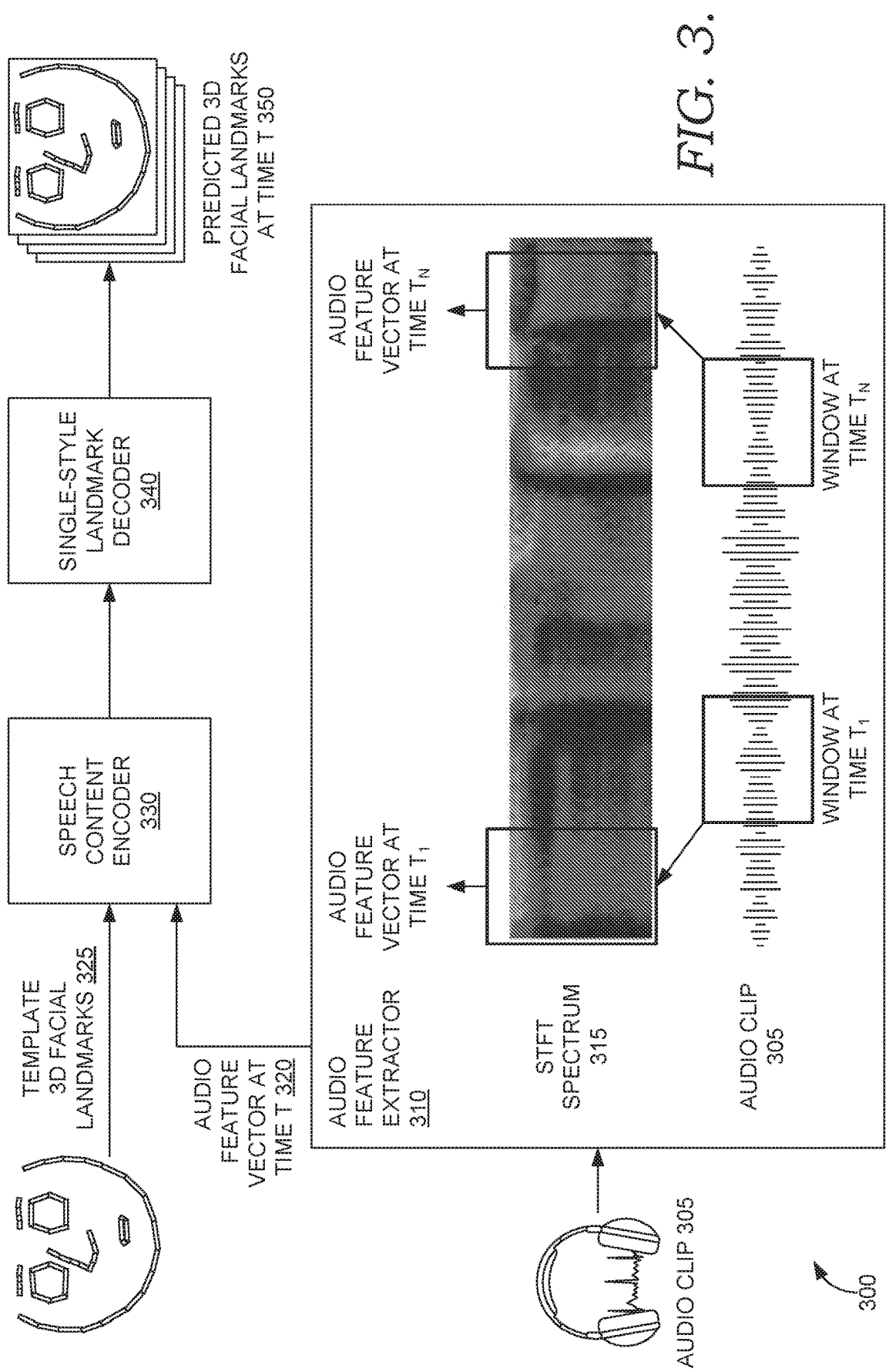
FIG. 3 is a block diagram of an example single-style landmark predictor, in accordance with some embodiments.
Figure 4:
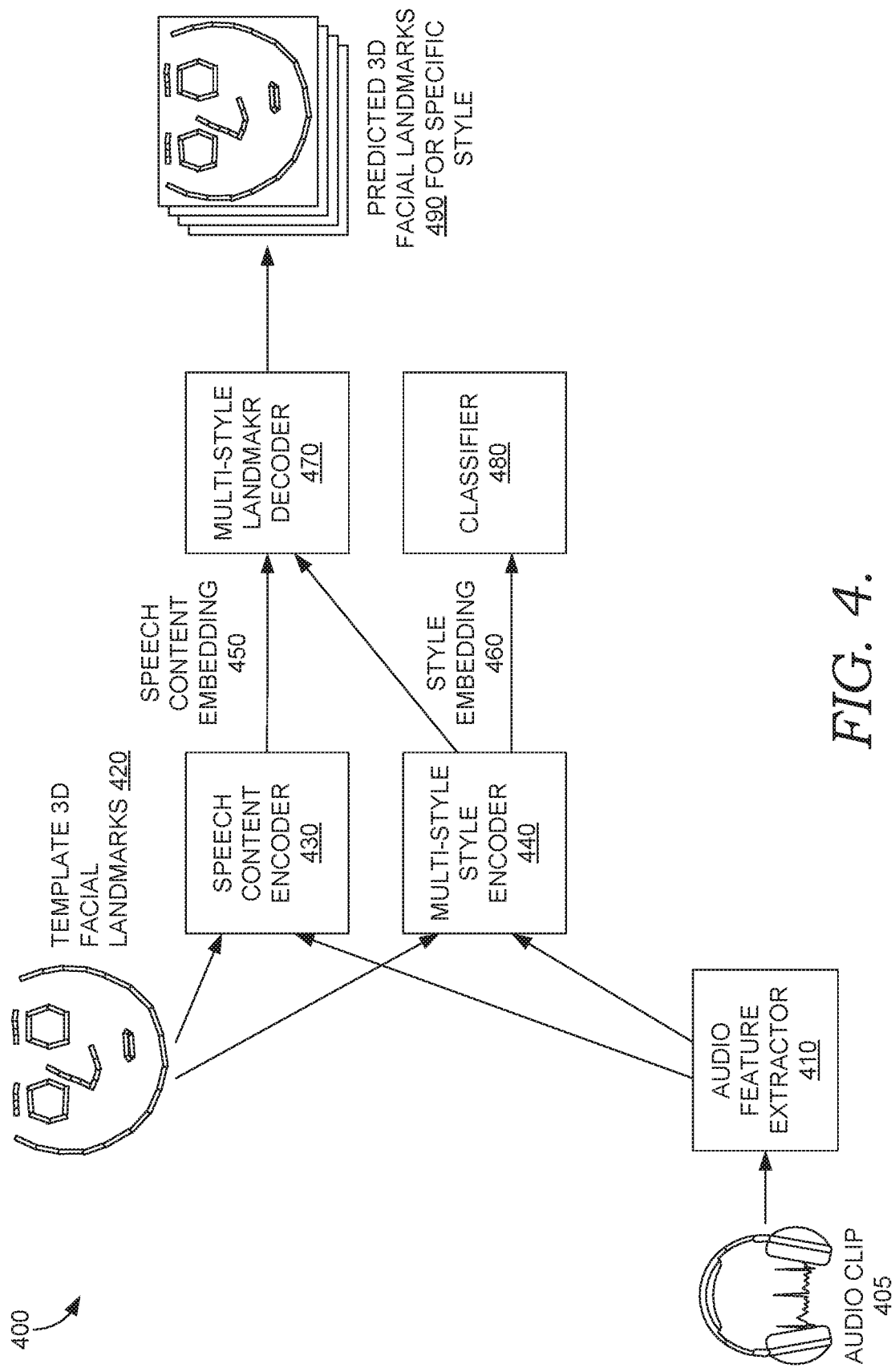
FIG. 4 is a block diagram of an example multi-style landmark predictor, in accordance with some embodiments.

Generally, landmark predictor 240 accepts as inputs the set of template facial landmarks 230 and audio feature vector 215, and generates a set of predicted 3D facial landmarks 250 corresponding to the window of audio 205 from which audio feature vector 215 was extracted. In other words, the set of predicted 3D facial landmarks reflects a predicted position, orientation, and/or expression of the body parts corresponding to the initial structure, when speaking the portion of speech in the window of audio. Generally, landmark predictor 240 may be designed to account for a single speaking style (e.g., single-style landmark predictor 130 of FIG. 1) or multiple speaking styles (e.g., multi-style landmark predictor 140 of FIG. 1). FIG. 3 illustrates an embodiment of a single-style landmark predictor, while FIG. 4 illustrates an embodiment of a multi-style landmark predictor.

In the embodiment illustrated in FIG. 3, single-style landmark predictor 300 can generate predicted 3D facial landmarks 350 from a single audio clip 305 and a set of template 3D facial landmarks 325. At a high level, single-style landmark predictor 300 may use a recurrent neural network (RNN) architecture to learn a mapping from an audio feature vector (e.g., audio feature vector 320) to corresponding 3D facial landmarks (e.g., predicted 3D facial landmarks 350) that reflect facial dynamics. In the example illustrated in FIG. 3, single-style landmark predictor 300 includes audio feature extractor 310, speech content encoder 330, and single-style landmark decoder 340.

Audio feature extractor 310 (which may correspond with audio feature extractor 210 of FIG. 2) generally extracts audio feature vectors from audio clip 305. For example, audio feature extractor 310 may identify a window of audio clip 305 at time $T_n$, generate a time-frequency representation of the chunk of audio in the window (e.g., STFT spectrogram 315, or a portion thereof), and generate an audio feature vector 320 for time $T_n$ by flattening the time-frequency representation into a single dimensional vector. By way of nonlimiting embodiment, audio feature extractor 310 may flatten STFT spectrogram 315 (or a portion thereof) by dropping phase values, splitting the STFT spectrogram along the time axis, and concatenating the resulting vectors of magnitude values into a single dimensional vector). Audio feature extractor 310 may advance the window by some step size and extract corresponding audio feature vectors from each window of audio clip 305. By way of nonlimiting example, audio clip 305 may have a 16 kHz sampling rate, a 30 ms window size may be used for each STFT, and a step size may be selected to provide a 160 sample overlap for successive windows. Of course, these values are meant simply as an example, and any other suitable values may be used. As such, audio feature extractor 310 may extract audio feature vectors from a sliding window of audio clip 305.

Generally, speech content encoder 330 may encode an extracted audio feature vector 320 and a set of template 3D facial landmarks 325 into a speech content embedding, and single-style landmark decoder 340 may decode the speech content embedding into a set of predicted 3D facial landmarks 350. For example, speech content encoder 330 may comprise a recurrent neural network (e.g., three layers, in a simple example) in order to capture history from a sequence of audio feature vectors. Single-style landmark decoder 340 may comprise a multilayer perceptron (MLP) network (e.g., three layers, in a simple example), which may serve to convert the dimensionality of the speech content embedding into a desired dimensionality for the predicted 3D facial landmarks. For example, if 68 facial landmark coordinates in 3D space are desired for each window of audio clip 305, and the output of speech content encoder 330 (the speech content embedding) has 256 dimensions, the architecture of single-style landmark decoder 340 may be selected to convert 256 dimensions into 68×3=204 dimensions. As such, in operation, speech content encoder 330 and single-style landmark decoder 340 may operate iteratively to predict 3D coordinates for a set of 3D facial landmarks 350 for each window of audio clip 305. These landmarks can then be used to drive facial motion for a video clip.

Single-style landmark predictor 300 (e.g., speech content encoder 330 and single-style landmark decoder 340) may be trained using any suitable training dataset. The training dataset can include any video(s) of a talking head (e.g., some person or character), and the training video(s) may be in any spoken language (e.g., English, Japanese, etc.). Generally, single-style landmark predictor 300 can learn to predict 3D facial landmarks that simulate the speaking style of the person or character in the training videos. For example, some duration of training videos (e.g., on the order of hours) may be identified, and the frame rate and audio sample rate may be converted to match the architecture of single-style landmark predictor 300 (e.g., convert video to 100 frames-per-second and audio to 16 kHz). One of the video frames may be used as a resting pose, and a set of template 3D facial landmarks may be extracted from the frame. The set of template 3D facial landmarks and extracted audio feature vectors may be fed into single-style landmark predictor 300 to predict 3D facial landmarks, the predicted 3D facial landmarks may be compared with ground truth 3D facial landmarks extracted from a corresponding video frame from a training video, and single-style landmark predictor 300 may be updated accordingly (e.g., by minimizing L2 distance between predicted and ground-truth facial landmarks). During test time and in operation, single-style landmark predictor 300 may be fed with facial landmarks from other characters or people to generate corresponding facial dynamics.

Turning now to FIG. 4, FIG. 4 illustrates a block diagram of an example multi-style landmark predictor 400, in accordance with some embodiments. Given a single audio clip 405 and a set of template 3D facial landmarks 420, multi-style landmark predictor 400 can generate predicted 3D facial landmarks 490 for a specific speaking style. At a high level, multi-style landmark predictor 400 may use a recurrent neural network (RNN) architecture to learn a mapping from an audio feature vector to corresponding 3D facial landmarks (e.g., predicted 3D facial landmarks 490) that reflect facial dynamics. To accomplish style adaptation, one recurrent neural network may be trained to encode speech content, and another recurrent neural network may be trained to encode speaking style. By training on videos depicting different speaking styles, the combined network can learn to simulate different types of motion dynamics carried by audio itself. In the example illustrated in FIG. 4, multi-style landmark predictor 400 includes audio feature extractor 410, speech content encoder 430, multi-style style encoder 440, multi-style landmark decoder 470, and classifier 480.

Generally, audio feature extractor 410 and speech content encoder 430 may operate in a similar manner as audio feature extractor 310 and speech content encoder 330 of FIG. 3, respectively. Further, multi-style style encoder 440 may have a similar structure as speech content encoder 430, but followed by a network (e.g., one-layer MLP network) to transform the output into a style embedding 460 (e.g., 128 dimensions). Multi-style landmark decoder 470 may have a similar structure as single-style landmark decoder 340 of FIG. 3 (e.g., another three-layer MLP network), but configured to use both the speech content embedding 450 and the style embedding 460 as inputs to predict 3D facial landmarks 490 that account for the particular speaking style used by the speaker of audio clip 405. To make style embedding 460 different for each speaking style (e.g., each speaker), classifier 480 may be applied on style embedding 460. Classifier 480 may be a multi-class classifier that includes a number of classes that correspond to the number of different speaking styles to be accounted for. In the example architecture illustrated in FIG. 4, classifier 480 effectively serves as a probe and a control knob during training. In other words, multi-style landmark predictor 400 can learn to account for different speaking styles at least in part by comparing ground truth data on the classification of a speaker in a training video with the output of classifier 480 during training, as explained in more detail below.

In operation, multi-style landmark predictor 400 can automatically detect different speaking styles in an arbitrary vocal clip and predict 3D facial landmarks corresponding to that style. In some embodiments, instead of automatically detecting a speaking style from a vocal clip, multi-style landmark predictor 400 can be selectively set to predict 3D facial landmarks for a specified style during operation. For example, upon receiving an input designating a desired style to use (e.g., via application 107 of FIG. 1), the input into multi-style landmark decoder 470 can be switched from accepting the output of multi-style style encoder 440 to accepting a style embedding corresponding to the input style. This configuration can force multi-style landmark decoder 470 to predict 3D facial landmarks corresponding to the specified style. In either scenario, whether automatically detecting a speaking style or using a hard-coded speaking style, multi-style landmark predictor 400 can adapt to different speaking styles. By way of nonlimiting example, given two pieces of input audio from different speakers (e.g., a politician and a comedian), the same multi-style landmark predictor 400 can predict different facial dynamics. For example, the audio of the politician might produce more neutral facial motions, whereas the audio of the comedian may generate much more dynamic or emotional motion.

Multi-style landmark predictor 400 (e.g., speech content encoder 430, multi-style style encoder 440, multi-style landmark decoder 470, and classifier 480) may be trained using any suitable training dataset. The training dataset can include any video(s) depicting different speaking styles with corresponding ground-truth classifications, and the training video(s) may be in any spoken language (e.g., English, Japanese, etc.). Generally, multi-style landmark predictor 400 can learn to predict 3D facial landmarks that simulate the speaking styles in the training videos. For example, multi-style landmark predictor 400 can be trained by minimizing both L2 distance loss between predicted and ground-truth facial landmarks for each speaker in the dataset, and the cross-entropy loss for classifier 480. Thus, multi-style landmark predictor 400 can be trained using a combined loss function applied during backpropagation. Accordingly, by training on different input videos depicting different speaking styles, multi-style landmark predictor 400 can learn to simulate different types of motion dynamics carried by audio itself.

In some embodiments, an initially trained landmark predictor (e.g., single-style landmark predictor 300 of FIG. 3 or multi-style landmark predictor 400 of FIG. 4) may be updated based on additional training video(s), which may be provided by an end user (e.g., using application 107 of FIG. 1). For example, a landmark predictor may be initially trained with a training video of a particular person or character so the landmark predictor initially learns to simulate the facial dynamics captured in the training video. Application 107 may allow the user to upload or otherwise identify or record a supplemental training video clip (e.g., a 5-10 minute clip) reflecting a desired speaking style (e.g., a recording of themselves or some other video capturing a desired speaking style), and the initially trained landmark predictor may be trained using the supplemental training video clip to update the base dynamics of the underlying model. As such, an initially trained landmark predictor can be transformed to simulate facial dynamics reflected in the supplemental training video clip.

Whether the predicted 3D facial landmarks are generated to account for different speaking styles, the predicted 3D facial landmarks may be used to drive an animation of a talking head. For example and returning to FIG. 2, in embodiments that that use an image to represent the head to animate, image warper 260 can use the predicted 3D facial landmarks to warp a static face in the image. Generally, for an input image with a face to animate (e.g., image 220), a set of template facial landmarks can be extracted (e.g., by facial landmark extractor 225) for that face. A landmark predictor (e.g., single-style landmark predictor 300 or multi-style landmark predictor 400) can be used to generate predicted 3D facial landmarks for that face. In some embodiments, image warper 260 may apply Delaunay triangulation on the predicted facial landmarks to derive a set of corresponding triangles, which can be used to subdivide the image into corresponding triangle regions. Each landmark point can be inserted into a corresponding triangle region, and image warper 260 can warp the image to align each landmark point with its corresponding triangle region. Any warping model may be used, which may be selected based on a desired number of degrees of freedom to preserve (e.g., rotate, rotate+scale, rotate+scale+skew). One example warping model that may be used is as-rigid-as-possible (ARAP) surface modeling, but any other warping model may be used. In some embodiments, the warping model may be applied using commercial software tools such as the Puppet Warp feature in ADOBE PHOTOSHOP®, ILLUSTRATOR®, or AFTER EFFECTS®. As such, warped images can be generated from each window of audio.

Generally, a sequence of warped images may be generated from a single input image 220, and the warped images can be used as individual frames for an animation video (e.g., compiled by animation compiler 270), using the input speech for audio. More specifically, the sequence of warped images can be compiled into a video track, for example, using one warped image per frame. Any suitable frame rate may be used (e.g., user-selected, pre-determined, etc.), and may correspond with the window and/or step size used by audio feature extractor 210. Audio 205 may be used as the audio track for the animation. As such, animation compiler 270 may compile animation 280 using the sequence of warped images generated by image warper 260 and audio 205.

Generally, 3D facial landmarks predicted using the present techniques can be used by themselves to drive an animation, or they can be combined with other animation techniques. By way of nonlimiting example, an existing full body animation technique can be supplemented with predictions for face and head movement generated using the present techniques. In another example, an existing lip sync technique can be supplemented with predictions reflecting how much to open the mouth generated using the present techniques. In yet another example, physics coupling can be applied to predictions for face and head movement in order to animate other regions such as hair, facial muscles, or ears, etc. These are just a few examples, and other animation techniques may be employed.

Example Flow Diagrams

Figure 5:
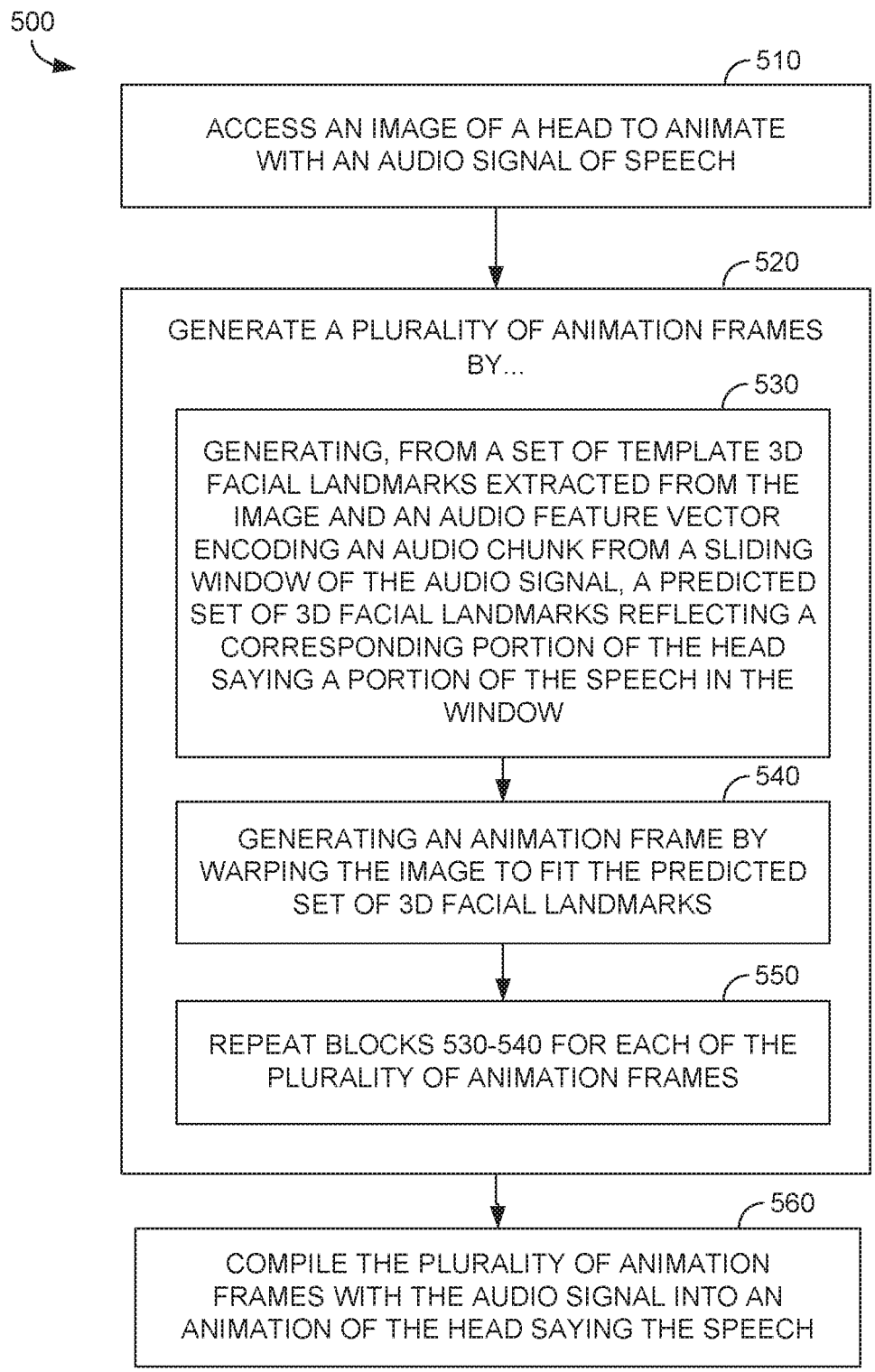
FIG. 5 is a flow diagram showing a method for audio-driven animation, in accordance with some embodiments.
Figure 6:
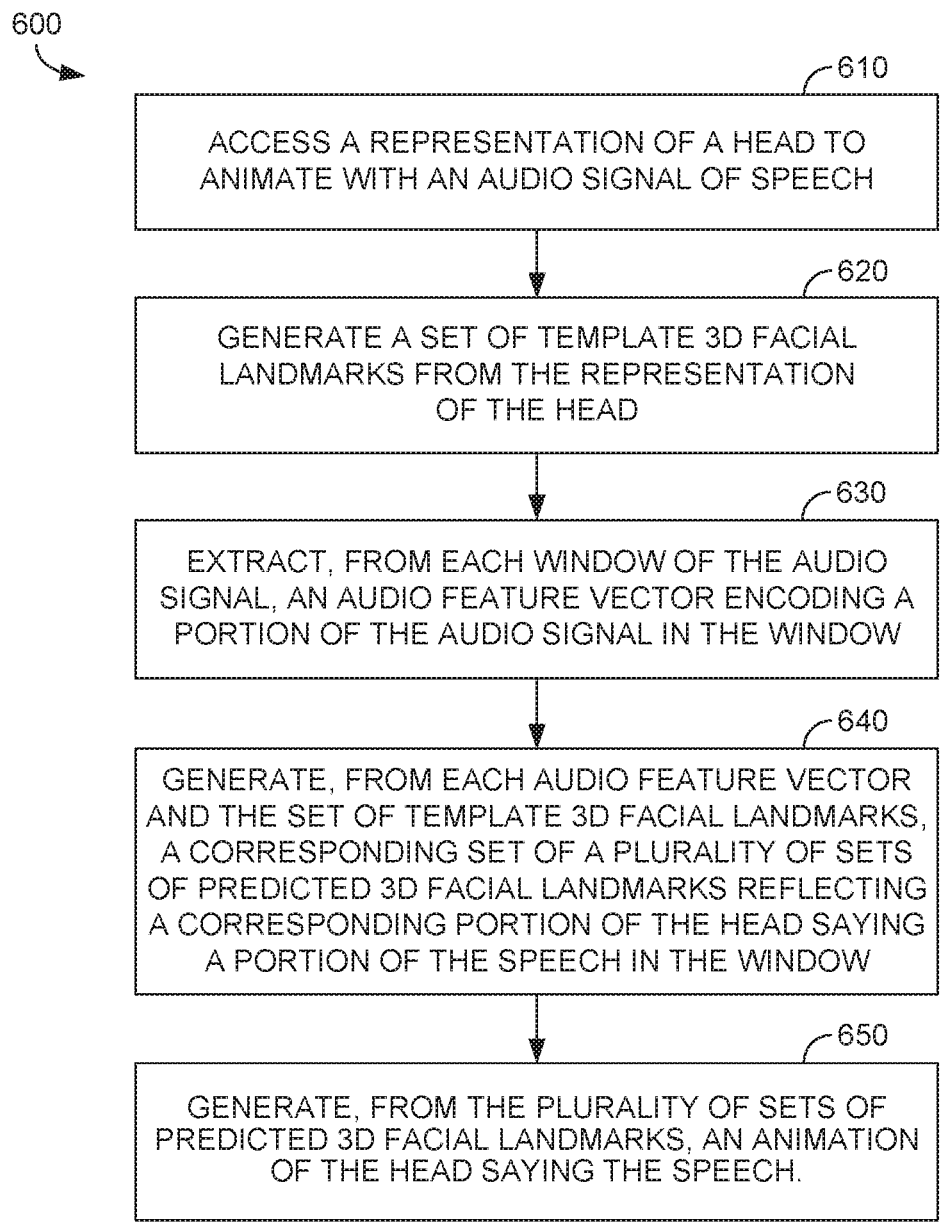
FIG. 6 is a flow diagram showing another method for audio-driven animation, in accordance with some embodiments.

With reference now to FIGS. 5-6, flow diagrams are provided illustrating some example methods for audio-driven animation. Each block of the methods 500 and 600 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 5, FIG. 5 illustrates a method 500 for audio-driven animation, in accordance with embodiments described herein. Initially at block 510, an image of a head to animate with an audio signal of speech is accessed. As used herein, a head may include any type of face, with or without boundaries (e.g., outer contours of the head). At block 520, a plurality of animation frames are generated through sub-blocks 520-550. More specifically, at block 530, a set of template 3D facial landmarks is extracted from the image, and an audio feature vector is extracted from an audio chunk from a sliding window of the audio signal. A set of predicted 3D facial landmarks is generated from the set of template 3D facial landmarks and the audio feature vector. The set of predicted 3D facial landmarks reflects a corresponding portion of the head saying the portion of the speech in the window of the audio signal. At block 540, an animation frame is generated by warping the image to fit the set of predicted 3D facial landmarks. Block 550 indicates that blocks 530-540 are repeated for each of the plurality of animation frames. For example, the sliding window may be advanced by a designated step size to extract audio feature vectors from corresponding chunks of audio, and each window may be used to generate a corresponding animation frame. At block 560, the plurality of animation frames are compiled with the audio signal into an animation of the head saying the speech.

Turning now to FIG. 6, FIG. 6 illustrates a method 600 for audio-driven animation, in accordance with embodiments described herein. Initially at block 610, a representation of a head to animate with an audio signal of speech is accessed. For example, the representation of the head may be an image, a 3D mesh, a 3D rig, or 2D layered artwork. At block 620, a set of template 3D facial landmarks is generated from the representation of the head. At block 630, an audio feature vector is extracted from each window of the audio signal. Each audio feature vector encodes a corresponding portion of the audio signal in the window. At block 640, a set of predicted 3D facial landmarks are generated from each audio feature vector and the set of template 3D facial landmarks, forming a plurality of sets of predicted 3D facial landmarks reflecting a corresponding portion of the head saying a portion of the speech in the window. At block 650, an animation of the head saying the speech is generated from the plurality of sets of predicted 3D facial landmarks.

Example Operating Environment

Figure 7:
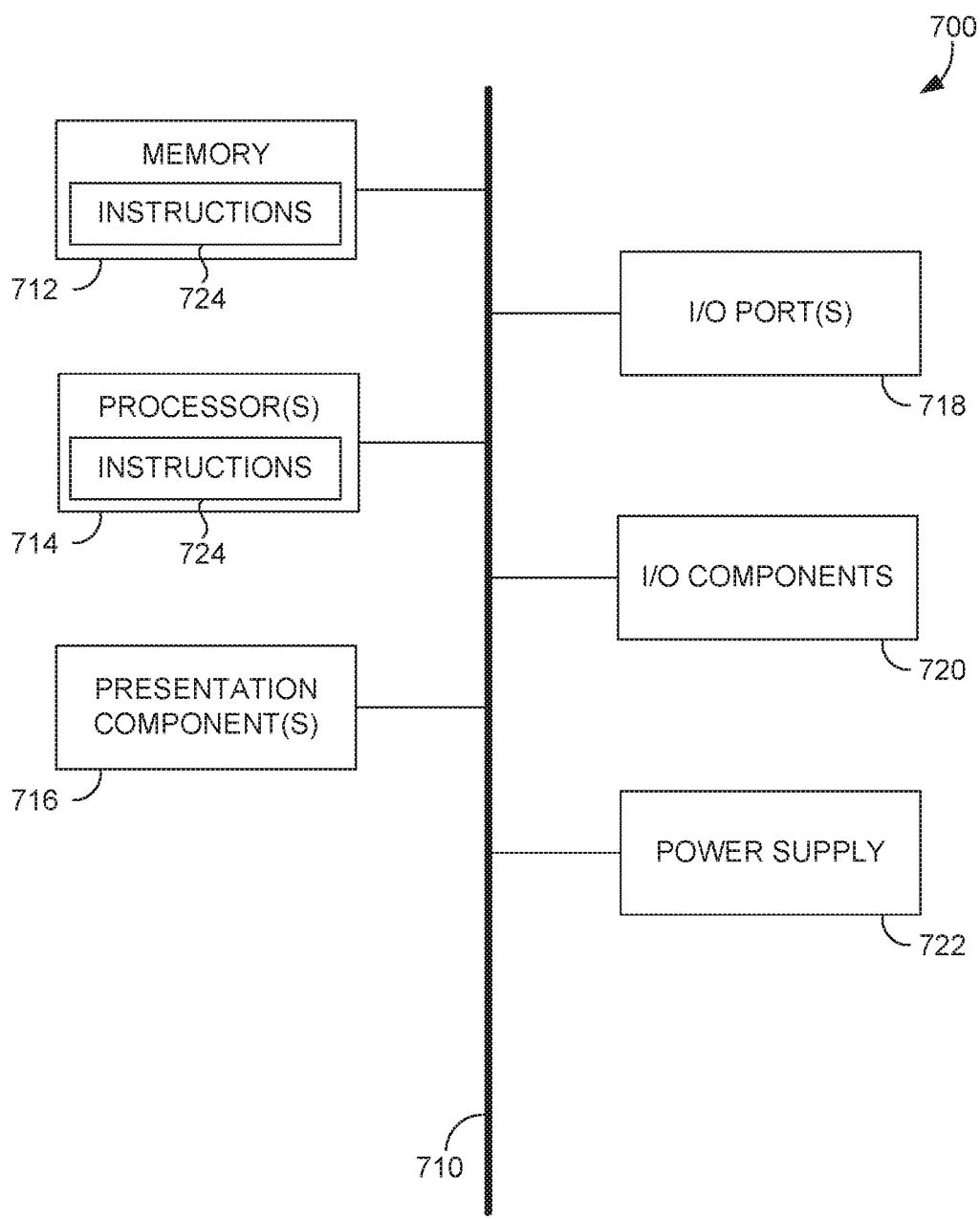
FIG. 7 is a block diagram of an example computing environment suitable for use in implementing some embodiments.

Having described an overview of embodiments of the present invention, an example operating environment in which embodiments of the present invention may be implemented is described below in order to provide a general context for various aspects of the present invention. Referring now to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Example presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 700. Computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of computing device 700 to render immersive augmented reality or virtual reality.

Embodiments described herein support audio-driven animation. The components described herein refer to integrated components of an audio-driven animation system. The integrated components refer to the hardware architecture and software framework that support functionality using the audio-driven animation system. The hardware architecture refers to physical components and interrelationships thereof and the software framework refers to software providing functionality that can be implemented with hardware embodied on a device.

The end-to-end software-based audio-driven animation system can operate within the audio-driven animation system components to operate computer hardware to provide audio-driven animation system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the audio-driven animation system components can manage resources and provide services for the audio-driven animation system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:

generating a representation of a portion of an audio signal of speech and a head to animate with the speech by combining an encoded window of audio from the audio signal with a representation of a resting pose of the head;

applying the representation of the portion of the audio signal and the head to a neural network to generate predicted 3D facial landmarks based on a particular speaking style of a plurality of supported speaking styles; and using the predicted 3D facial landmarks to generate an animation of the head saying the speech by warping the head to fit the predicted 3D facial landmarks by warping the representation of the resting pose of the head to fit the predicted 3D facial landmarks generated from the encoded window of audio.

2. The one or more computer storage media of claim 1, wherein the neural network comprises a multi-style landmark decoder configured to generate the predicted 3D facial landmarks based on user input selecting the particular speaking style.

3. The one or more computer storage media of claim 1, wherein the neural network comprises a multi-style landmark decoder configured to generate the predicted 3D facial landmarks based on automatically detecting the particular speaking style.

4. The one or more computer storage media of claim 1, wherein the neural network is configured to separately encode speech content and speaking style and decode a combined representation of the speech content and the speaking style.

5. The one or more computer storage media of claim 1, wherein generating the representation of the portion of the audio signal of speech and the head to animate with the speech comprises extracting the representation of the resting pose of the head from an image, a 3D mesh, a 3D rig, or 2D layered artwork.

6. The one or more computer storage media of claim 1, wherein the predicted 3D facial landmarks represent a subset of body parts of the head, and wherein the animation of the head selectively animates and synchronizes motion of the subset of body parts based on the speech and the particular speaking style.

7. The one or more computer storage media of claim 1, the operations further comprising generating each animation frame of the animation based on a corresponding window of audio from the audio signal by warping the head to fit the predicted 3D facial landmarks predicted for the corresponding window of audio without predicting a phoneme for the corresponding window.

8. A computerized method comprising:

applying a representation of a portion of an audio signal of speech and a head to animate with the speech to a neural network to generate predicted 3D facial landmarks based on a particular speaking style of a plurality of supported speaking styles; and using the predicted 3D facial landmarks to generate an animation of the head saying the speech by warping the head to fit the predicted 3D facial landmarks, wherein the predicted 3D facial landmarks represent a subset of body parts of the head, and wherein the animation of the head selectively animates and synchronizes motion of the subset of body parts based on the speech and the particular speaking style.

9. The computerized method of claim 8, wherein the neural network comprises a multi-style landmark decoder configured to generate the predicted 3D facial landmarks based on user input selecting the particular speaking style.

10. The computerized method of claim 8, wherein the neural network comprises a multi-style landmark decoder configured to generate the predicted 3D facial landmarks based on automatically detecting the particular speaking style.

11. The computerized method of claim 8, wherein the neural network is configured to separately encode speech content and speaking style and decode a combined representation of the speech content and the speaking style.

12. The computerized method of claim 8, further comprising generating the representation of the portion of the audio signal of speech and the head to animate with the speech based at least on combining an encoded window of audio from the audio signal with a representation of a resting pose of the head and warping the head comprises warping the representation of the resting pose of the head to fit the predicted 3D facial landmarks which are based on the encoded window of audio.

13. The computerized method of claim 8, further comprising generating the representation of the portion of the audio signal of speech and the head to animate with the speech based at least on extracting a representation of a resting pose of the head from an image, a 3D mesh, a 3D rig, or 2D layered artwork.

14. The computerized method of claim 8, further comprising generating each animation frame of the animation based on a corresponding window of audio from the audio signal without predicting a phoneme for the corresponding window by warping the head to fit the predicted 3D facial landmarks predicted for the corresponding window of audio.

15. A computer system comprising:

one or more hardware processors and memory configured to provide computer program instructions to the one or more hardware processors, the computer program instructions comprising;

a landmark predictor configured to generate, by applying a representation of a portion of an audio signal of speech and a head to animate with the speech by combining an encoded window of audio from the audio signal with the head to a neural network, predicted 3D facial landmarks based on a particular speaking style of a plurality of supported speaking styles; and an animation compiler configured to generate, using the predicted 3D facial landmarks, an animation of the head saying the speech by warping the head to fit the predicted 3D facial landmarks by generating each animation frame of the animation based on the encoded window of audio from the audio signal by warping the head to fit the predicted 3D facial landmarks predicted for the encoded window of audio without predicting a phoneme for the encoded window of audio.

16. The computer system of claim 15, wherein the neural network comprises a multi-style landmark decoder configured to generate the predicted 3D facial landmarks based on user input selecting the particular speaking style.

17. The computer system of claim 15, wherein the neural network comprises a multi-style landmark decoder configured to generate the predicted 3D facial landmarks based on automatically detecting the particular speaking style.

18. The computer system of claim 15, wherein the neural network is configured to separately encode speech content and speaking style and decode a combined representation of the speech content and the speaking style.

19. The computer system of claim 15, wherein the landmark predictor is configured to generate the representation of the portion of the audio signal of speech and the head to animate with the speech based at least on combining the encoded window of audio from the audio signal with a representation of a resting pose of the head and warping the head comprises warping the representation of the resting pose of the head to fit the predicted 3D facial landmarks which are based on the encoded window of audio.

20. The computer system of claim 15, wherein the predicted 3D facial landmarks represent a subset of body parts of the head, and wherein the animation of the head selectively animates and synchronizes motion of the subset of body parts based on the speech and the particular speaking style.

* * * * *